United States Patent Office 3,207,569
Patented Sept. 21, 1965

3,207,569
MIXTURE OF ANTHRAQUINONE AND AZO DYES, DYEING ESTER TYPE TEXTILES THEREWITH AND THE DYED TEXTILES FROM SAID PROCESS
Ludwig Thummel, Basel, Switzerland, assignor to Sandoz Ltd. (also known as Sandoz A.G.), Basel, Switzerland
No Drawing. Filed Jan. 24, 1964, Ser. No. 339,903
Claims priority, application Switzerland, Jan. 25, 1963, 959/63
11 Claims. (Cl. 8—26)

It is known that textile materials of ester type fibers can be dyed simultaneously or in any desired order with dyes having the formulae:

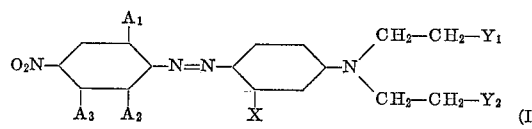

(I)

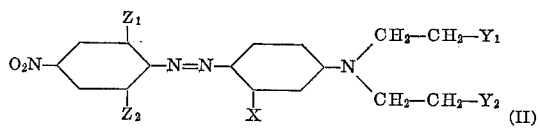

(II)

and

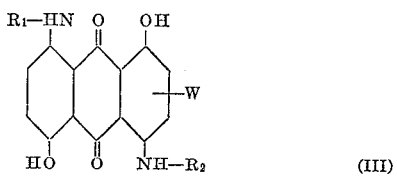

(III)

In these formulae $A_1$ stands for a chlorine or bromine atom, $A_2$ and $A_3$ stand for a chlorine, bromine or hydrogen atom, one of which being a hydrogen atom and the other a chlorine or bromine atom, X for a hydrogen or chlorine atom or a methyl or ethyl radical, $Y_1$ for a hydrogen atom, a low-molecular alkyl radical, an alkanoyloxy radical, preferably an acetoxy or propionlyoxy radical, or the nitrile group, $Y_2$ for an alkanoyloxy radical, preferably an acetoxy or propionyloxy radical, a methoxycarbonyl or ethoxycarbonyl group (carboxylic acid methyl ester or carboxylic acid ethyl ester group) or the nitrile group, $Z_1$ for a chlorine or bromine atom, the trifluoromethyl or the nitrile group, $Z_2$ for a hydrogen atom or when $Z_1$ stands for the nitrile group, for a hydrogen atom or for a chlorine or bromine atom, $R_1$ and $R_2$ for a hydrogen atom or a low-molecular alkyl radical, and W for a hydrogen, chlorine or bromine atom or an alkoxy, aryloxy or hydroxyaryl radical, in particular the hydroxyphenyl or alkoxyphenyl radical.

It has now been found that dark shades and black dyeings can be produced better on semi-synthetic and fully synthetic ester type fiber materials when, in addition to the dyes of Formulae I, II and III, a diaminoanthraquinone is used, one amino group of which is substituted by an aryl radical free from carboxylic and sulfonic acid groups (dye IV). The other amino group of the diaminoanthraquinone can be substituted by an alkyl radical. Thus this application concerns the new mixtures of dyes and a process for dyeing, padding and printing using these mixtures and the materials dyed, padded or printed therewith.

A mixture of dyes of the above formulae can be prepared and used in the dye-bath, padding liquor or printing paste. They can also be applied to the fiber singly. The order of application may be varied at will.

Preferred dyes of Formula I are those of Formula V, and the best dyes of Formula II have the Formula VI:

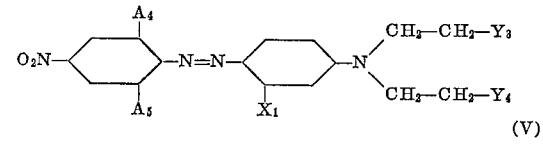

(V)

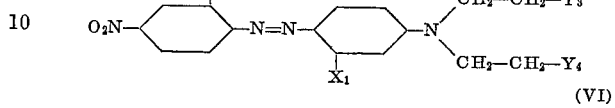

(VI)

In formulae V and VI $A_4$ and $A_5$ each represent a chlorine or bromine atom, $X_1$ a hydrogen atom or the methyl group, $Y_3$ a hydrogen atom or the nitrile group or an alkanoyloxy group, $Y_4$ the nitrile group or an alkanoyloxy group, and $Z_3$ a chlorine or bromine atom or the nitrile group. The preferred alkanoyloxy groups are the acetoxy and propionyloxy groups.

Mixtures of dyes from any of groups (I) to (VI) can be employed. A particularly good mixture is that of 2-(3)-p-hydroxyphenyl - 1,5 - diamino - 4,8 - dihydroxyanthraquinone and 2-(3)-p-methoxyphenyl-1,5-diamino-4,8-dihydroxyanthraquinone as a dye of Formula III.

The additional use of anthraquinone having one hydroxyl group in one α-position and three amino groups in α-positions, of which one or two are monoalkylated and preferably monomethylated, often improves the appearance of the shade in artificial light. Excellent dyes and mixtures of dyes of this type are obtained by the reaction of α,α'-dihydroxy-α'',α'''-diaminoanthraquinonesulfonic acids with boric acid, hydrosulfite and methyl amine. A dye mixture of this nature is designated "Dye E" in certain of the following examples.

The new mixtures of dyes contain about 1 to 15 parts of a dye (I) to 1 to 25 parts of a dye (II), 5 to 25 parts of a dye (III) and 5 to 20 parts of a dye (IV). Particularly good results are obtained when the mixtures contain, in relation to 1 to 8 parts of a dye I and preferably of a dye V 1 to 10 parts of a dye (II) and preferably of a dye (VI), 5 to 20 parts of a dye (III) and 5 to 15 parts of a dye IV, or a mixture of each of these groups. When a dye of Type "E" is used, 1 to 8 parts of dye (I) are used to about 1 to 5 parts of the Type "E" dye itself. All the parts given are by weight on the pure dye. In the preparation of new mixtures of commercial dyes, allowance must be made for the fact that they contain dispersing agents, salts, and other additives.

The term "ester type fiber materials" in this context refers especially to fiber materials of linear aromatic polyesters and of cellulose acetate. Linear aromatic polyesters are linear polycondensation products of terephthalic acid and glycols, in particular ethylene glycol, which are sold under the registered trade names "Terylene," "Dacron," "Tergal," "Trevira," "Diolen," "Terital" and "Teron" ("Fortrel"), and also to modified polyesters such as, e.g., "Vycrony" (registered trade name), which is a polycondensation product of terephthalic and isophthalic acids and ethylene glycol, and "Kodel" (registered trade name), which is the condensation product of dimethyl terephthalate and 1.4-cyclohexanedimethanol [Martin, E. V., "Structure and Properties of a New Polyester Fiber," Textile Research Journal, vol. 32, No. 8, page 619, August 1962]. Under "cellulose acetate" is to be understood primarily secondary cellulose acetate (cellulose-2½-acetate) and cellulose triacetate.

The amount of any of the aforedescribed dyes or dye mixtures which can be applied from a long liquor ratio varies from about 0.01 to 10 grams per 100 grams of the material to be dyed. In padding the dye concentration may be 0.01 to 150 grams or preferably 0.1 to 100 grams per liter padding liquor, and in printing approximately 0.1 to 150 grams per kilogram of the printing paste. The optimum pH range is from about 2 to 9, or preferably from 4 to 8. The dyeing temperatures generally chosen range from about 70° to 140° C.; in the case of secondary cellulose acetate the upper limit is preferably 80° C., for cellulose triacetate preferably 115° C., and for polyester fibers preferably 130° C. The liquor ratio can vary within wide limits, e.g., from about 1:3 to 1:200, or preferably from 1:3 and 1:80. At long liquor ratios the dyeing time is about 30 to 90 minutes.

It is of advantage in dyeing, padding and printing to employ one of the dispersing agents in general use, in particular those of the anionic or non-ionic types, or alternatively a mixture of such dispersing agents. Often an addition of about 0.5 gram dispersing agent per liter of the dyebath or padding liquor is sufficient, though larger amounts can be used, e.g., up to about 3 grams per liter. Amounts in excess of 5 grams per liter do not usually offer advantages. Known anionic dispersing agents which can be chosen for use in the process are, for example, the condensation products of naphthalenesulfonic acids and formaldehyde, notably dinaphthylmethane disulfonates, the esters of sulfonated succinic acid, alkylarylsulfonic acids, Turkey red oil, the alkali salts of sulfuric acid semi-esters of fat alcohols, e.g. sodium lauryl sulfate and sodium cetyl sulfate, sulfite cellulose waste liquor and its salts, soaps, alkali metal sulfates of monoglycerides of fatty acids, or salts of sulfonated alkylpolyether alcohols. Examples of known and especially suitable non-ionic dispersing agents are the addition products of approximately 3–40 moles of ethylene oxide and alkyl phenols, fatty alcohols and their sulfuric acid ester alkali salts, polyethylene glycol and fatty amines. In padding and printing the standard thickening agents are employed, e.g., modified or unmodified natural products, for instance sodium alginates, British gum, gum arabic, crystal gum, locust bean gum, gum tragacanth, carboxymethyl cellulose, hydroxyethyl cellulose, starches, and synthetic products such as polyacrylamides and polyvinyl alcohols.

The dyed, padded or printed dye is generally fixed on the fiber by heat treatment. This treatment can be carried out in the dyebath or subsequent to impregnation with the dyeing medium by means of heating in a dry or moist atmosphere. The fixation temperature is generally about 100° to 140° C. in the presence of water vapor, or 150° to 235° C. when the atmosphere is dry.

The dyeings, pad dyeings and prints have good to very good fastness properties, e.g. good fastness to light, wet treatments such as washing, water, swimming pool and sea water, and to steam, dry cleaning, perspiration, sublimation, heat setting, rubbing, chlorine, peroxide, hypochlorite, cross dyeing, pleating, and gas fumes. The dyeing do not change shade when the goods are heat set, even when the setting temperature is high.

The mixing proportions given in the foregoing are especially good for producing fast navy blue and black dyeings, as well as dark grey and dark brown shades. A dyeing on polyester material produced with a mixture of dyes (I) to (IV) has a light fastness of 6 to 7. This is surprising because dye (IV), dyed alone on polyester fibers, has a light fastness of only 2, while dye (IV) alone is considerably less fast to pleating and sublimation on this type of fiber.

It is noteworthy that deep dark grey and dark brown and especially deep dark blue and black dyeings are obtained on fibers of linear aromatic polyesters, which are submitted to a heat treatment to improve their textile properties. The heat treatment is termed setting and is performed either before the application of the dye or afterwards. The method is described in Du Pont Technical Bulletin D-147, May 1962, page 12 et seq., "Dyeing and Finishing of Dacron Polyester Staple—Basic Information." Generally, the heat treatment reduces the depth or causes a change in the shade, but with the dye mixtures claimed herein these disadvantages are absent.

The parts and percentages given in the following examples are by weight and the temperatures in degrees centigrade.

Example 1

A concentrated dispersion is prepared with 4 parts of a mixture of 1.7 parts of 2,6-dichloro-4-nitro-4'-(N-cyanethyl-N-acetoxyethyl)-amino-1,1' - azobenzene (A), 3.7 parts of 2-chloro-4-nitro-4'-(N-cyanethyl-N-acetoxyethyl)-amino-1,1'-azobenzene (B), 14.1 parts of a technical mixture of p-hydroxyphenyl-1,5-diamino-4,8-dihydroxyanthraquinone and p-methoxyphenyl-1,5 - diamino-4,8-dihydroxyanthraquinone (C), 15.7 parts of 1-amino-4-phenylaminoanthraquinone (D), 20 parts of sodium dinaphthylmethane disulfonate, 20 parts of sodium cetyl sulfate and 25 parts of anhydrous sodium sulfate, these components being mixed with a little water. The dispersion is run through a sieve into the dyebath which is set with 0.5 gram per liter of lauryl alcohol sulfonate. The liquor ratio is 1:40, though it can be varied within wide limits.

100 parts of a scoured fabric of "Dacron" polyester fiber is entered in to the bath at 40–50°. The bath is heated slowly and after the addition of 10 parts of an emulstion of a chlorinataed benzene in water the fabric is dyed for 1 to 2 hours at 95–100°. It is then rinsed, soaped, rinsed again and dried. The fabric is dyed navy blue. The dyeing is fast to light, washing, water, sea water, perspiration, cross dyeing, gas fumes, sublimation, heat setting and pleating.

In place of 100 parts of "Dacron," 100 parts of a polyester material other than the polycondensation products of terephthalic acid and ethylene glycol, e.g. "Kodel," can be dyed in the same way and with the same good fastness properties.

Example 2

A mixture of the dyes used in Example 1 is used, namely 7 parts of dye (A), 9 parts of (B), 8 parts of (C) and 10 parts of (D). 7.5 parts of this mixture are dispersed in water containing 66 parts of dried sulfite cellulose waste liquor. Dyeing is carried out in this dyebath by the method described in Example 1. A dark brown dyeing is obtained which has the fastness properties enumerated in that example.

Example 3

A mixture is prepared with 7 parts of the dye (A) of Example 1, 1.8 parts of dye (B), 11.2 parts of dye (C), 14 parts of dye (D), 41 parts of dried sulfite cellulose waste liquor and 25 parts of anhydrous sodium sulfate. 6 parts of this mixture are dispersed in water and the dispersion used for dyeing by the method of Example 1. A dark grey dyeing with the fastness properties there mentioned is obtained.

Example 4

A mixture is prepared with 6 parts of the dye (A) of Example 1, 7.5 parts of (B), 10 parts of (C), 11.5 parts (D), 20 parts of sodium dinaphthylmethane disulfonate, 20 parts of sodium cetyl sulfate and 25 parts of anhydrous sodium sulfate. 8 parts of this mixture are prepared as an aqueous suspension, which is used for dyeing by the method described in Example 1. A black dyeing with the fastness properties there mentioned is obtained.

Example 5

A mixture is prepared with 6 parts of dye (A) of Example 1, 7.5 parts of (B), 9 parts of (C), 9.6 parts of (D), 2.9 parts of the dye "E" produced by the method described below, 20 parts of sodium dinaphthylmethane disulfonate and 45 parts of dried sulfite cellulose waste liquor. 8 parts of this mixture are used for preparing an aqueous suspension. This is applied by the method described in Example 1 to give a dyeing with the fastness properties as the dyeing of that example. Through the addition of 2.9 parts of dye (E) the same good fastness properties are obtained with a better shade in artificial light, i.e. the shade remains the same in natural and artificial light.

*Example 6*

100 parts of a scoured fabric of "Dacron" polyester fiber is introduced at 40–50° into any one of the dispersions prepared as given in Examples 1 to 5. The dispersion is heated slowly and after the addition of 10 parts of an aqueous emulsion of ortho-phenyl phenol, e.g. "Carolid" (registered trade name), the fabric is dyed for 1–2 hours at 95–100°. According to the dispersion used, it is dyed to navy blue, dark brown, dark grey or black, and in each case the dyeing has the good fastness properties mentioned in Example 1.

*Example 7*

100 parts of a scoured fabric of polyester fiber is entered into an aqueous dispersion prepared with one of the dye mixtures used in Examples 1 to 5. It is dyed for 30–60 minutes at 120–130° under pressure, and then rinsed, soaped, rinsed again and dried. A navy blue, dark brown, dark grey or black dyeing with excellent fastness properties is obtained, according to the dispersion used.

*Example 8*

A fine aqueous dispersion of 15 parts of the dye mixture used in Example 5 is mixed with 600 parts of crystal gum (1:2) and 250 parts of water. The resulting paste is printed on a polyester fiber fabric, and the print dried, steamed for 20 minutes in saturated steam at 1 atmosphere excess pressure, rinsed, soaped and dried. A black, sharp-edged print having very good fastness properties is obtained.

*Example 9*

A fine aqueous dispersion of 100 parts of the dye mixture used in Example 5 is mixed with 2 parts of sodium alginate and 1000 parts of water. With this liquor a polyester fiber fabric is padded at a temperature between 20° and 70°, and subsequently air-dried at 60–100°, treated in dry air atmosphere at 180–220° for 30–90 seconds, rinsed, soaped and dried. A black dyeing with good fastness properties is obtained.

*Example 10*

3 parts of the dye (A) used in Example 1, 3.7 parts of dye (B), 4.5 parts of (C), 4.8 parts of (D), 1.4 parts of dye (E), 15 parts of dried sulfite cellulose waste liquor and 5 parts of sodium dinaphthylmethane disulfonate are mixed with 62.5 parts of water. 200 parts of this paste are mixed with 2 parts of sodium alginate and 800 parts of water. This liquor is padded on a polyester fabric, and the padding dried, fixed and rinsed as outlined in Example 9. A black, spot-free dyeing is obtained which has good fastness properties.

*Example 11*

100 parts of a cellulose triacetate fabric are dyed with 8 parts of a dispersion of the dye mixture used in Example 5. A black dyeing with good fastness properties is obtained.

*Method of producing Dye E.*—52 parts of the technical mixture of the sodium salts of 1,5-dihydroxy-4,8-diaminoanthraquinone-2,6-disulfonic acid and 1,8-dihydroxy-4,5-diaminoanthraquinone-2,7-disulfonic acid are entered into 300 parts of water. 20 parts of boric acid cryst., 230 parts of a 20% aqueous solution of monomethyl amine and 46 parts of hydrosulfite 85% are added. The reaction mixture is heated for 24 hours at 90° with reflux and with stirring. The product is then filtered off hot with suction, washed with hot water until colorless and of neutral reaction, and finally dried at 60° in vacuum.

10 parts of the dye so formed are dissolved in 70 parts of sulfuric acid 96% at a temperature not higher than 20°. The solution is run into 1000 parts of water and the precipitated dye filtered off with suction and washed until neutral. It is pasted with water, 15 parts of a condensation product of naphthalene disulfonic acid and formaldehyde are added as dispersing agent, the paste dried and the powder ground to the required size.

Having thus disclosed the invention, what I claim is:

1. Process for the production of dark shades on textile materials of ester type fibers which comprises impregnating these materials with aqueous dispersions containing from 1 to 8 parts by weight of 1 to 2 dyes of the formula

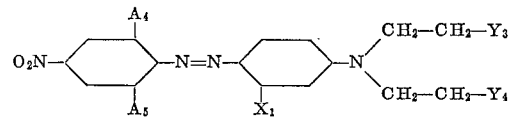

from 1 to 10 parts by weight of 1 to 2 dyes of the formula

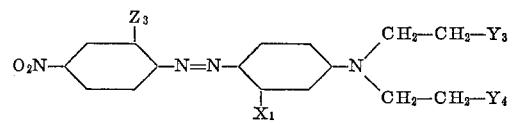

from 5 to 20 parts by weight of 1 to 2 dyes of the formula

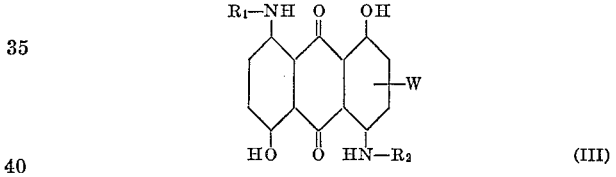

(III)

and from 5 to 15 parts by weight of 1-amino-4-phenyl-aminoanthraquinone wherein
  $A_4$ represents a member selected from the class consisting of chlorine and bromine,
  $A_5$ represents a member selected from the class consisting of chlorine and bromine,
  $X_1$ represents a member selected from the class consisting of hydrogen and methyl,
  $Y_3$ represents a member selected from the class consisting of hydrogen, nitrile and alkanoyloxy of the formula $-O-CO-(CH_2)_n-H$, $n$ being one of the integers 1 and 2,
  $Y_4$ represents a member selected from the class consisting of nitrile and alkanoyloxy of the formula $-O-CH-(CH_2)_n-H$, $n$ being one of the integers 1 and 2,
  $Z_3$ represents a member selected from the class consisting of chlorine, bromine and nitrile,
  $R_1$ represents a member selected from the class consisting of hydrogen and low-molecular alkyl,
  $R_2$ represents a member selected from the class consisting of hydrogen and low-molecular alkyl and
  W represents a member selected from the class consisting of hydrogen, chlorine, bromine, low-molecular alkoxy, aryloxy and hydroxyaryl.

2. Process according to claim 1, wherein a technical mixture of 2-(3)-p-hydroxy-phenyl-1,5-diamino-4,8-dihydroxyanthraquinone and 2-(3)-p-methoxyphenyl 1,5-diamino-4,8-dihydroxyanthraquinone is the dye of Formula III.

3. Process for the production of dark shades on textile materials of ester type fibers which comprises impregnating these materials with aqueous dispersions containing from 1 to 8 parts by weight of 1 to 2 dyes of the formula $$O_2N-\underset{A_5}{\overset{A_4}{\bigcirc}}-N=N-\underset{X_1}{\bigcirc}-N\underset{CH_2-CH_2-Y_4}{\overset{CH_2-CH_2-Y_3}{}}$$

from 1 to 10 parts by weight of 1 to 2 dyes of the formula $$O_2N-\underset{}{\overset{Z_3}{\bigcirc}}-N=N-\underset{X_1}{\bigcirc}-N\underset{CH_2-CH_2-Y_4}{\overset{CH_2-CH_2-Y_3}{}}$$

from 5 to 20 parts by weight of 1 to 2 dyes of the formula $$\begin{array}{c} R_1-NH \quad O \quad OH \\ \bigcirc\bigcirc\bigcirc-W \\ HO \quad O \quad HN-R_2 \end{array}$$

from 5 to 15 parts by weight of 1-amino-4-phenyl-aminoanthraquinone and from 1 to 5 parts by weight of anthraquinones; having one hydroxyl group in one α-position and having three amino groups in the other α-positions, 1 to 2 of these amino groups being monoalkylated, wherein $A_4$ is a member selected from the group consisting of chlorine and bromine, $A_5$ is a member selected from the group consisting of chlorine and bromine, $X_1$ is a member selected from the group consisting of hydrogen and methyl, $Y_3$ is a member selected from the group consisting of hydrogen, nitrile and alkanoyloxy of the formula —O—CO—(CH$_2$)$_n$—H, $n$ being one of the integers 1 and 2, $Y_4$ is a member selected from the group consisting of nitrile and alkanoyloxy of the formula —O—CO—(CH$_2$)$_n$—H $n$ being one of the integers 1 and 2, $Z_3$ is a member selected from the group consisting of chlorine, bromine and nitrile, $R_1$ is a member selected from the group consisting of hydrogen and lower alkyl, $R_2$ is a member selected from the group consisting of hydrogen and lower alkyl and W is a member selected from the group consisting of hydrogen, chlorine, bromine, lower alkoxy, aryloxy and hydroxyaryl.

4. Process according to claim 1, wherein the textile materials are dyed.

5. Process according to claim 1, wherein the textile materials are padded.

6. Process according to claim 1, wherein the textile materials are printed.

7. An aqueous dispersion containing from 1 to 8 parts by weight of 1 to 2 dyes of the formula $$O_2N-\underset{A_5}{\overset{A_4}{\bigcirc}}-N=N-\underset{X_1}{\bigcirc}-N\underset{CH_2-CH_2-Y_4}{\overset{CH_2-CH_2-Y_3}{}}$$

from 1 to 10 parts by weight of 1 to 2 dyes of the formula $$O_2N-\underset{}{\overset{Z_3}{\bigcirc}}-N=N-\underset{X_1}{\bigcirc}-N\underset{CH_2-CH_2-Y_4}{\overset{CH_2-CH_2-Y_3}{}}$$

from 5 to 20 parts by weight of 1 to 2 dyes of the formula $$\begin{array}{c} R_1-NH \quad O \quad OH \\ \bigcirc\bigcirc\bigcirc-W \\ HO \quad O \quad HN-R_2 \end{array}$$

and from 5 to 15 parts by weight of 1-amino-4-phenyl-aminoanthraquinone; in each of the formulae $A_4$ being a member selected from the group consisting of a chlorine atom and a bromine atom;

$A_5$ being a member selected from the group consisting of a chlorine atom and a bromine atom;

$X_1$ being a member selected from the group consisting of a hydrogen atom and methyl;

$Y_3$ being a member selected from the group consisting of a hydrogen atom, nitrile and —O—CO—(CH$_2$)$_n$—H wherein $n$ is one of the integers 1 and 2;

$Y_4$ is a member selected from the group consisting of a nitrile and —O—CO—(CH$_2$)$_n$—H wherein $n$ is a positive whole number of at most 2;

$Z_3$ is a member selected from the group consisting of a chlorine atom, a bromine atom and a nitrile;

$R_1$ is a member selected from the group consisting of a hydrogen atom and lower alkyl;

$R_2$ is a member selected from the group consisting of a hydrogen atom and lower alkyl; and W is a member selected from the group consisting of a hydrogen atom, a chlorine atom, a bromine atom, lower alkoxy, aryloxy and hydroxyaryl.

8. An aqueous dispersion containing from 1 to 8 parts by weight of 1 to 2 dyes of the formula $$O_2N-\underset{A_5}{\overset{A_4}{\bigcirc}}-N=N-\underset{X_1}{\bigcirc}-N\underset{CH_2-CH_2-Y_4}{\overset{CH_2-CH_2-Y_3}{}}$$

from 1 to 10 parts by weight of 1 to 2 dyes of the formula $$O_2N-\underset{}{\overset{Z_3}{\bigcirc}}-N=N-\underset{X_1}{\bigcirc}-N\underset{CH_2-CH_2-X_4}{\overset{CH_2-CH_2-Y_3}{}}$$

from 5 to 20 parts by weight of 1 to 2 dyes of the formula $$\begin{array}{c} R_1-NH \quad O \quad OH \\ \bigcirc\bigcirc\bigcirc-W \\ HO \quad O \quad HN-R_2 \end{array}$$

from 5 to 15 parts by weight of 1-amino-4-phenylamino-anthraquinone and from 1 to 5 parts by weight of α-hydroxy-tri-α-aminoanthraquinone dye, from 1 to 2 of the 3 α-amino groups being monoalkylamino; in each of the formula $A_4$ being a member selected from the group consisting of a chlorine atom and a bromine atom;

$A_5$ being a member selected from the group consisting of a chlorine atom and a bromine atom;

$X_1$ being a member selected from the group consisting of a hydrogen atom and methyl;

$Y_3$ being a member selected from the group consisting of a hydrogen atom, nitrile and —O—CO—(CH$_2$)$_n$—H wherein $n$ is one of the integers 1 and 2;

$Y_4$ is a member selected from the group consisting of nitrile and —O—CO—(CH$_2$)$_n$—H wherein $n$ is a positive whole number of at most 2;

$Z_3$ is a member selected from the group consisting of a chlorine atom, a bromine atom and nitrile;

$R_1$ is a member selected from the group consisting of a hydrogen atom and lower alkyl;

$R_2$ is a member selected from the group consisting of a hydrogen atom and lower alkyl; and W is a member selected from the group consisting of a hydrogen atom, a chlorine atom, a bromine atom, lower alkoxy, aryloxy and hydroxyaryl.

9. Textile material of ester type fibers impregnated with from 1 to 8 parts by weight of 1 to 2 dyes of the

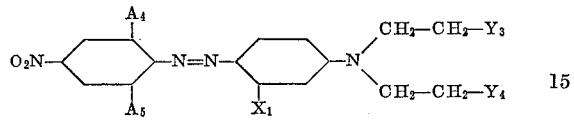

from 1 to 10 parts by weight of 1 to 2 dyes of the formula

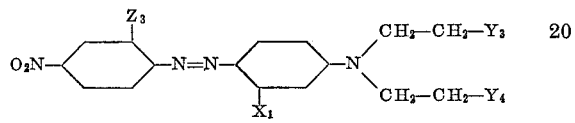

from 5 to 20 parts by weight of 1 to 2 dyes of the formula

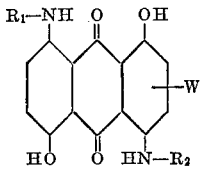

and from 5 to 15 parts by weight of 1-amino-4-phenyl-aminoanthraquinone; in each of the formulae $A_4$ being a member selected from the group consisting of a chlorine atom and a bromine atom;

$A_5$ being a member selected from the group consisting of a chlorine atoms and a bromine atom;

$X_1$ being a member selected from the group consisting of a hydrogen atom and methyl;

$Y_3$ being a member selected from the group consisting of a hydrogen atom, nitrile and $$-O-CO-(CH_2)_n-H$$

wherein $n$ is one of the integers 1 and 2;

$Y_4$ is a member selected from the group consisting of nitrile and $-O-CO-(CH_2)_n-H$ wherein $n$ is a positive whole number of at most 2;

$Z_3$ is a member selected from the group consisting of a chlorine atom, a bromine atom and nitrile;

$R_1$ is a member selected from the group consisting of a hydrogen atom and lower alkyl;

$R_2$ is a member selected from the group consisting of a hydrogen atom and lower alkyl; and W is a member selected from the group consisting of a hydrogen atom, a chlorine atom, a bromine atom, lower alkoxy, arloxy and hydroxyaryl.

10. The textile materials dyed by the process claimed in claim 3.

11. Aqueous dye dispersion, the dye of which consists essentially of from 1 to 8 parts by weight of 2,6-dichloro-4 - nitro - 4'-(N-cyanoethyl-N-acetoxyethyl)-amino-1,1'-azobenzene, from 1 to 10 parts by weight of 2-chloro-4-nitro - 4' - (N - cyanoethyl - N-acetoxyethyl)-amino-1,1'-azobenzene, from 5 to 20 parts by weight of a mixture of p - hydroxyphenyl - 1.5-diamino-4,8-dihydroxyanthraquinone and p-methoxyphenyl-1,5-diamino-4,8-dihydroxyanthraquinone, and from 5 to 15 parts by weight of 1-amino-4-phenylaminoanthroquinone.

References Cited by the Examiner
FOREIGN PATENTS 604,720    10/61    Belgium.

OTHER REFERENCES

Derwent Belgian Report No. 82A, page A7, published Dec. 8, 1961.

NORMAN G. TORCHIN, *Primary Examiner.*

UNITED STATES PATENT OFFICE
CERTIFICATE OF CORRECTION

Patent No. 3,207,569            September 21, 1965

Ludwig Thummel

It is hereby certified that error appears in the above numbered patent requiring correction and that the said Letters Patent should read as corrected below.

Column 1, lines 28 to 35, the formula should appear as shown below instead of as in the patent:

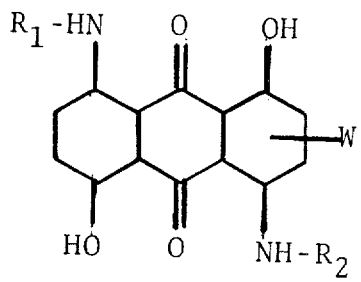

same column 1, line 57, for "and fully" read -- and fully- --; column 2, line 59, for '"Vycrony"' read -- "Vycron" --; line 63, for "1.4-cyclohexanedimethanol" read -- 1,4-cyclohexanedimethanol --; column 3, lines 55 and 56, for "dyeing" read -- dyeings --; column 4, line 26, for "in to" read -- into --; line 28, for "emulstion" read -- emulsion --; line 62, for "(D)," read -- of (D), --; column 6, line 70, for "-methoxyphenyl 1,-5-" read -- -methoxyphenyl-1,5- --; column 8, line 26, for "and a nitrile;" read -- and nitrile; --; line 60, for "formula" read -- formulae --; column 9, line 11, for "of the" read -- of the formula --; line 40, for "atoms" read -- atom --; column 10, line 18, for "arloxy" read -- aryloxy --; line 27, for "-1.5-diamino" read -- -1,5-diamino --.

Signed and sealed this 10th day of May 1966.

(SEAL)
Attest:

ERNEST W. SWIDER
Attesting Officer

EDWARD J. BRENNER
Commissioner of Patents